P. S. WEAVER.
SHOCK ABSORBER.
APPLICATION FILED MAY 24, 1919.
1,338,270.
Patented Apr. 27, 1920.
2 SHEETS—SHEET 1.
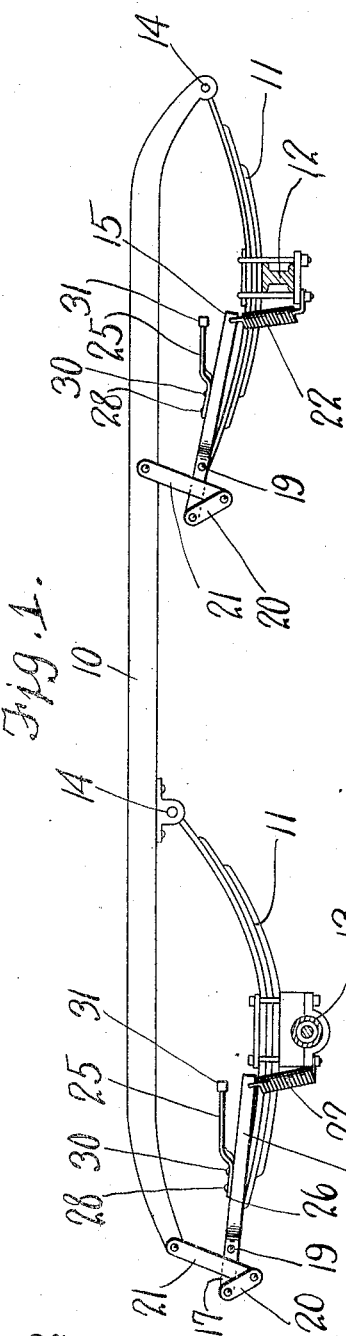
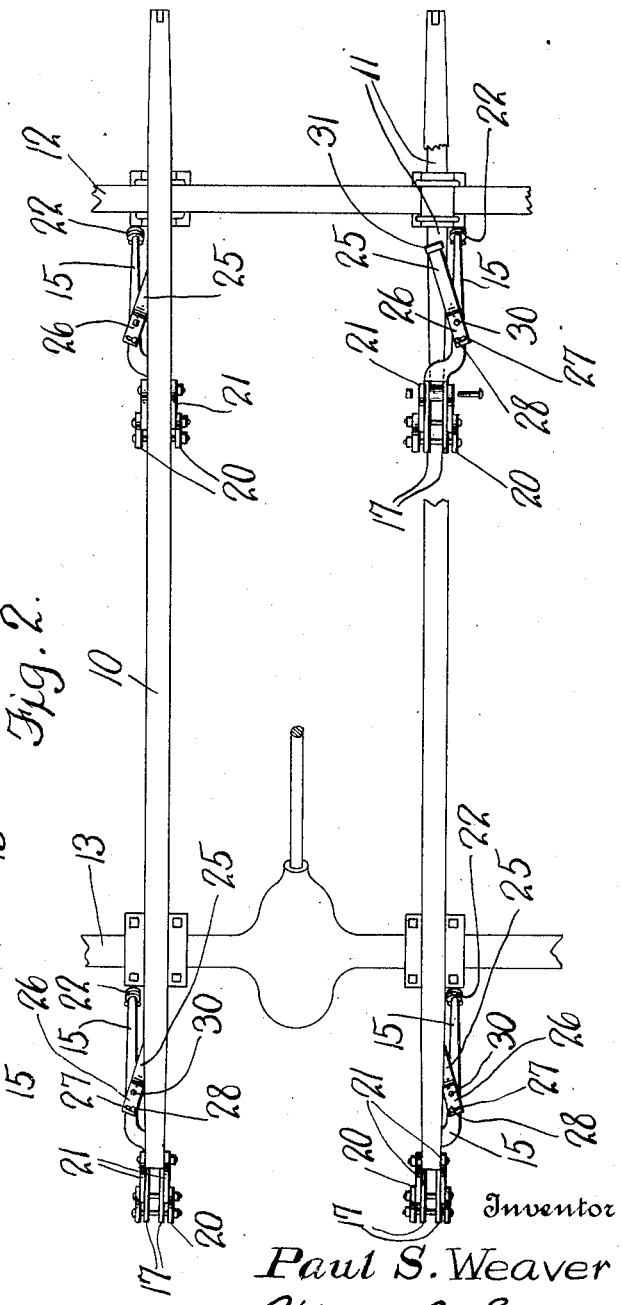
Witnesses
L. B. James
Inventor
Paul S. Weaver
By Victor J. Evans
Attorney

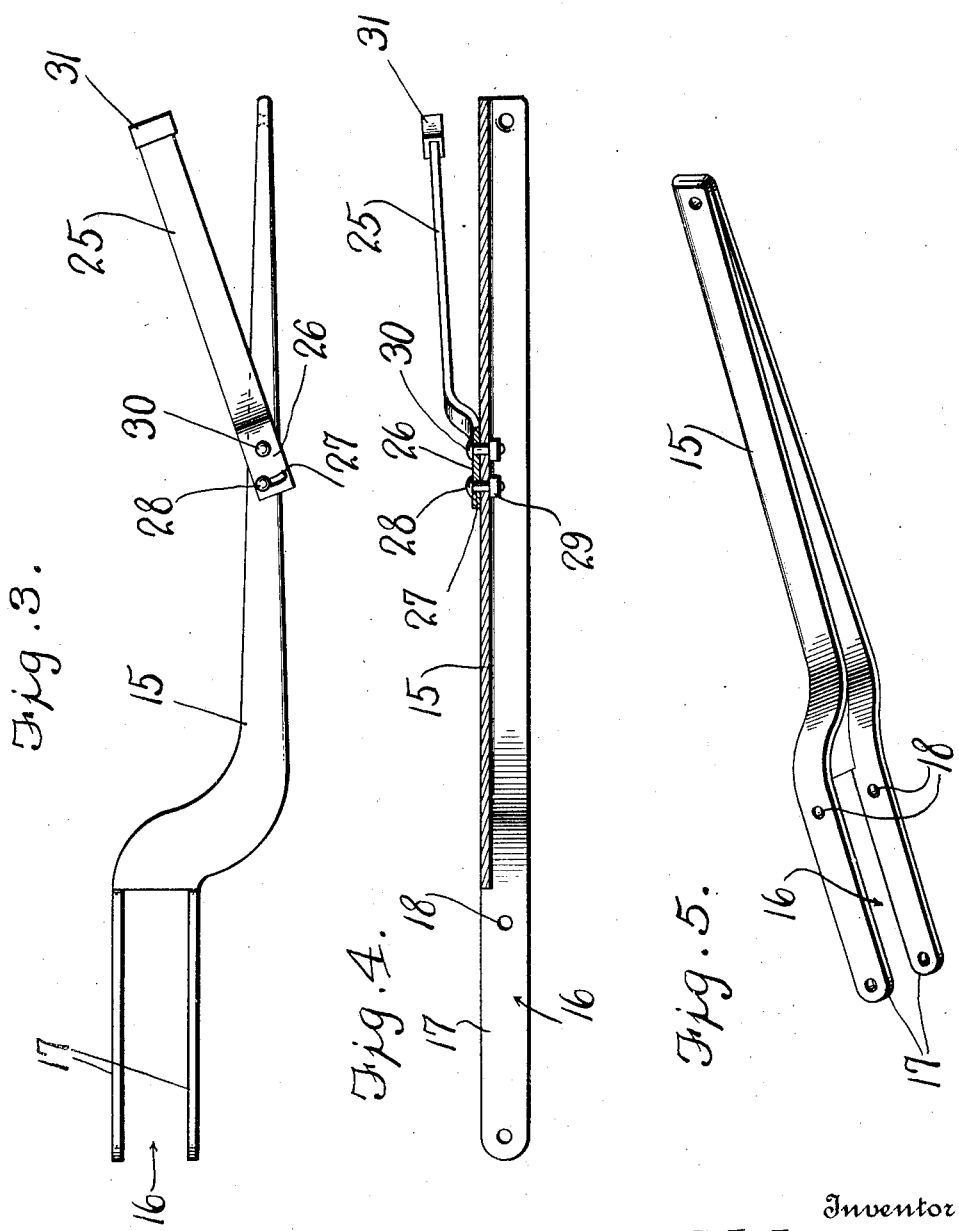

UNITED STATES PATENT OFFICE.

PAUL S. WEAVER, OF LEBANON, PENNSYLVANIA.

SHOCK-ABSORBER.

1,338,270.  Specification of Letters Patent.  Patented Apr. 27, 1920.

Application filed May 24, 1919. Serial No. 299,422.

*To all whom it may concern:*

Be it known that I, PAUL S. WEAVER, a citizen of the United States, residing at Lebanon, in the county of Lebanon and State of Pennsylvania, have invented new and useful Improvements in Shock - Absorbers, of which the following is a specification.

This invention relates to shock absorbers for motor vehicles, and comprehends the provision of means for absorbing the shock and vibration of the vehicle bearing a predetermined weight, in combination with an auxiliary means for taking care of the vibration incident to any additional weight of the extraordinary load.

To this end the invention makes use of a lever having a pivotal connection with the terminal of the semi-elliptical spring of the vehicle, a toggle connection associating one end of the lever with the frame of the car, while a coiled spring provides a connection between the opposite end of the lever and the axle upon which the spring is supported. A leaf spring projects from said lever and terminates beneath the frame of the car, so that should the latter be lowered under the weight of the extraordinary load, beyond a point where the coil spring is of any use to absorb the shock, the leaf spring functions to take care of the excessive weight, thus preventing the frame from being suddenly stopped in its movements by coming in contact with the elliptical spring or axle.

In carrying out my invention, I provide an adjustment between the lever and the leaf spring, so that the latter can be conveniently and properly disposed beneath the chassis of the car, for the purpose above mentioned, thus permitting of its use with any type of vehicle.

The nature and advantages of the invention will be better understood when the following detailed description is taken in connection with the accompanying drawing, the invention residing in the construction, combination and arrangement of parts as claimed.

In the drawings forming part of this specification, like numerals of reference indicate similar parts in the several views, and wherein:

Figure 1 is a side elevation showing the manner of associating the semi-elliptical spring with the chassis in accordance with my invention.

Fig. 2 is a top plan view partly in section.

Fig. 3 is a plan view of the lever and its associated leaf spring.

Fig. 4 is a longitudinal sectional view therethrough.

Fig. 5 is a perspective view of the lever.

Referring to the drawings in detail, 10 indicates the chassis of the vehicle, 11 the semi-elliptical springs which are supported in the usual well known manner upon the front and rear axles 12 and 13 respectively. The forward terminal of each of said springs are pivotally connected to the chassis as at 14, while the opposite corresponding extremities of these springs are connected with the chassis in the manner to be presently described.

For this purpose, I preferably make use of a lever indicated at 15 and of substantially U-shaped formation in cross section. One end of the lever is bifurcated as at 16, and this terminal is offset as clearly shown in the drawings, so that the separated portions 17 defined by the bifurcation can straddle or receive the rear extremity of each of the springs 11. It is obvious, that the connection between the rear end of each spring and the chassis is exactly the same, and the brief description of one will suffice for both. The separated portions 17 are provided with alined openings 18 through which and one end of the spring 11 is passed a pivot bolt 19. Pivotally associated with the bifurcated extremity of the lever 15 is the link 20 of a toggle connection between said lever and the chassis 10. The link 20 normally projects downwardly and has its free end pivotally connected with the adjacent end of the remaining link 21 of said toggle connection, the latter mentioned link being pivotally associated with the chassis 10. One end of a coil spring 22 is secured to the means employed for holding the springs 11 fixed to their respective axles, while the opposite end of this spring is attached to the adjacent end of the lever 15. It is manifest, that by reason of this construction, and arrangement, that when the chassis 10 is lowered under the weight of a load, the rear end of the elliptical springs 11 will be lowered, with a result of a lifting or raising of the forward end of the lever 15. Consequently, with this movement of the lever, the spring 22 is placed under tension to absorb the shock or vibration of the vehicle. It is to be understood that the spring 22 can be varied in size and strength, for use in connection with a touring car, truck or any size vehicle.

However, this spring 22 will absorb the shock and vibration of a vehicle bearing a predetermined load, and with a view of taking care of an excessive weight due to an extraordinary load, I have preferably employed a leaf spring 25 having an offset extremity 26 which is suitably secured to the lever 15 for pivotal movement. As clearly illustrated in Fig. 2, the main portion of the levers 15 are disposed to one side of the chassis 10, and as it is necessary that one end of the leaf spring 25 be disposed beneath the chassis 10, I provide the offset extremity 26 with an arcuate shaped slot 27 through which and the lever 15 a bolt 28 is passed, the latter having a nut 29 associated therewith to hold the spring 25 fixed in any given position with relation to the lever 15, it being above stated that the spring 25 is mounted for swinging movement upon its pivot 30. In practice, should the chassis 10 be lowered under the weight of a load, beyond a point where the coiled spring 22 is of any use to take care of the shock, the chassis 10 will be brought into contact with the leaf spring 25. This spring then functions to absorb the shock and vibration incident to the excessive weight of the load, and prevents the chassis from being suddenly stopped with a jar, by coming in contact with the elliptical springs 11 or the axles of the vehicle. If desired, the free end of the spring 25 may be provided with a bumper 31 of rubber, or other suitable material. It is to be noted, that the construction and arrangement of parts forming the subject matter of this invention, is such that the invention can be readily and easily applied to any make or type of car.

While it is believed that from the foregoing description the nature and advantages of the invention will be better understood, I desire to have it understood that what is shown and described is merely illustrative of the preferred embodiment of the invention, to which I do not limit myself, and that such changes may be resorted to when desired, as fall within the scope of what is claimed.

What I claim is:—

1. In a shock absorber for vehicles, the combination with the chassis and semi-elliptical springs having one end connected to the chassis, of a toggle connection between the opposite end of each spring and said chassis, and including a lever pivotally connected with the adjacent end of said spring, resilient means having connection with the free end of said lever and adapted to absorb the shock incident to a predetermined weight, and a leaf spring connected with said lever and arranged beneath the chassis to absorb the shock of any excessive weight.

2. In a shock absorber for vehicles, the combination with the chassis and semi-elliptical springs having one end connected to the chassis, of a toggle connection between the opposite end of each spring and said chassis, and including a lever pivotally connected with the adjacent end of said spring, a resilient means having connection with the free end of said lever for absorbing the shock incident to a predetermined weight, said lever being disposed to one side of the chassis, a leaf spring pivoted on said lever and adapted to have one end disposed beneath the chassis, whereby said leaf spring absorbs the shock of any excessive weight, and means for holding the leaf spring fixed relatively to the lever in adjusted position.

In testimony whereof I affix my signature.

PAUL S. WEAVER.